(12) United States Patent
Zitzmann et al.

(10) Patent No.: US 10,837,838 B2
(45) Date of Patent: *Nov. 17, 2020

(54) SUBSTRATE FOR A SENSOR ASSEMBLY FOR A RESISTANCE THERMOMETER, SENSOR ASSEMBLY, RESISTANCE THERMOMETER AND METHOD OF PRODUCING SUCH A SUBSTRATE

(71) Applicant: TE Connectivity Sensors Germany GmbH, Dortmund (DE)

(72) Inventors: Heinrich Zitzmann, Lauf a.d. Pegnitz (DE); Horst Sirtl, Lauf a.d. Pegnitz (DE); Dirk Nusse, Dortmund (DE)

(73) Assignee: TE CONNECTIVITY SENSORS GERMANY GMBH, Dortmund (DE)

( * ) Notice: Subject to any disclaimer, the term of this patent is extended or adjusted under 35 U.S.C. 154(b) by 485 days.

This patent is subject to a terminal disclaimer.

(21) Appl. No.: 15/366,300

(22) Filed: Dec. 1, 2016

(65) Prior Publication Data
US 2017/0153148 A1 Jun. 1, 2017

(30) Foreign Application Priority Data
Dec. 1, 2015 (DE) .......................... 10 2015 223 950

(51) Int. Cl.
| | |
|---|---|
| *G01K 7/00* | (2006.01) |
| *G01K 1/14* | (2006.01) |
| *H01C 7/02* | (2006.01) |
| *G01K 7/18* | (2006.01) |

(52) U.S. Cl.
CPC .............. *G01K 1/14* (2013.01); *G01K 7/18* (2013.01); *H01C 7/02* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,831,512 | A * | 11/1998 | Wienand | G01K 7/183 338/25 |
| 5,846,891 | A * | 12/1998 | Son | C04B 35/117 501/127 |
| 8,730,002 | B2 | 5/2014 | Wienand et al. | |
| 2002/0000598 | A1* | 1/2002 | Kang | C23C 16/34 257/301 |
| 2004/0040843 | A1* | 3/2004 | Weyl | G01N 27/4077 204/424 |
| 2005/0062581 | A1* | 3/2005 | Koyama | G01K 7/22 338/22 R |

(Continued)

FOREIGN PATENT DOCUMENTS

| | | |
|---|---|---|
| DE | 19934109 C1 | 4/2001 |
| JP | 04265828 A | 9/1992 |

OTHER PUBLICATIONS

German Office Action, dated Aug. 30, 2016, 5 pages.
Abstract of DE 19934109, dated Apr. 5, 2001, 1 page.
Abstract of JPH04265828, dated Sep. 22, 1992, 2 pages.

*Primary Examiner* — Stephen D Meier
*Assistant Examiner* — Nasir U. Ahmed

(57) ABSTRACT

A substrate for a sensor assembly of a resistance thermometer is disclosed. The substrate is comprised of aluminum oxide and zirconium dioxide and has a thermal coefficient of expansion approximately equal to the terminal coefficient of expansion of platinum.

10 Claims, 6 Drawing Sheets

(56) References Cited

U.S. PATENT DOCUMENTS

2011/0117784 A1* 5/2011 Matsuoka ............ H01R 13/504
439/626
2015/0292955 A1 10/2015 Wienand et al.

* cited by examiner

SUBSTRATE FOR A SENSOR ASSEMBLY FOR A RESISTANCE THERMOMETER, SENSOR ASSEMBLY, RESISTANCE THERMOMETER AND METHOD OF PRODUCING SUCH A SUBSTRATE

CROSS-REFERENCE TO RELATED APPLICATIONS

This application claims the benefit of the filing date under 35 U.S.C. § 119(a)-(d) of German Patent Application No. 102015223950.0, filed on Dec. 1, 2015.

FIELD OF THE INVENTION

The present invention relates to a sensor assembly, and more particularly, to a substrate for a sensor assembly of a resistance thermometer.

BACKGROUND

Resistance thermometers known in the art have a measuring structure made of platinum, which is arranged on a substrate. The substrate and the measuring structure in known resistance thermometers have different thermal coefficients of expansion. When known resistance thermometers are stressed by abrupt changes in temperature, alterations and damage, which act on the entire measuring structure and falsify the measurement values as a result, can occur at the boundary layer between the substrate and the measuring structure. Consequently, a temperature measurement made by the resistance thermometer becomes more unreliable over time.

SUMMARY

An object of the invention, among others, is to provide a substrate for a sensor assembly of a resistance thermometer which does not suffer alterations or damage at a boundary layer and provides stable measurements in the long term. The disclosed substrate is comprised of aluminum oxide and zirconium dioxide and has a thermal coefficient of expansion approximately equal to the terminal coefficient of expansion of platinum.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
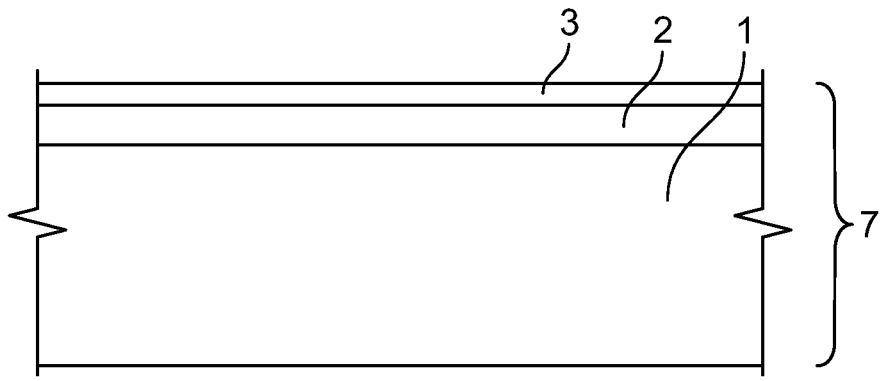
FIG. 1 is a sectional view of a sensor assembly according to the invention.

Embodiments of the present invention will be described hereinafter in detail with reference to the attached drawings, wherein like reference numerals refer to the like elements. The present invention may, however, be embodied in many different forms and should not be construed as being limited to the embodiments set forth herein; rather, these embodiments are provided so that the disclosure will be thorough and complete, and will fully convey the concept of the invention to those skilled in the art.

A sensor assembly 7 for a resistance thermometer according to the invention is shown generally in FIG. 1. The sensor assembly 7 comprises a substrate 1 on which there is arranged a measuring structure 2 made of platinum. The measuring structure 2 is in turn covered by a cover layer 3.

The substrate 1 serves as a support for the measuring structure 2, which can be very fragile. The measuring structure 2, in an embodiment of the invention, is a meandering structure. The resistance of the measuring structure 2 changes depending on the temperature. This change in resistance can be measured and the temperature can be deduced from this.

The substrate 1 can have a thermal coefficient of expansion approximately equal to the thermal coefficient of expansion of platinum, in other words, the thermal coefficient of expansion of the substrate 1 deviates by a maximum of approximately 10% from the thermal coefficient of expansion of platinum. In other embodiments, an even lower deviation of 5%, 3%, 2% or less can be selected. The thermal coefficients of expansion of the substrate 1 and of the platinum measuring structure 2 are adapted to one another and can in particular deviate from one another within the specified ranges only in a region relevant for measuring, for example in a region in which the sensor assembly 7 is operated later, for instance from −50° C. to 1000° C. They may deviate further from one another outside such a region.

Figure 2:
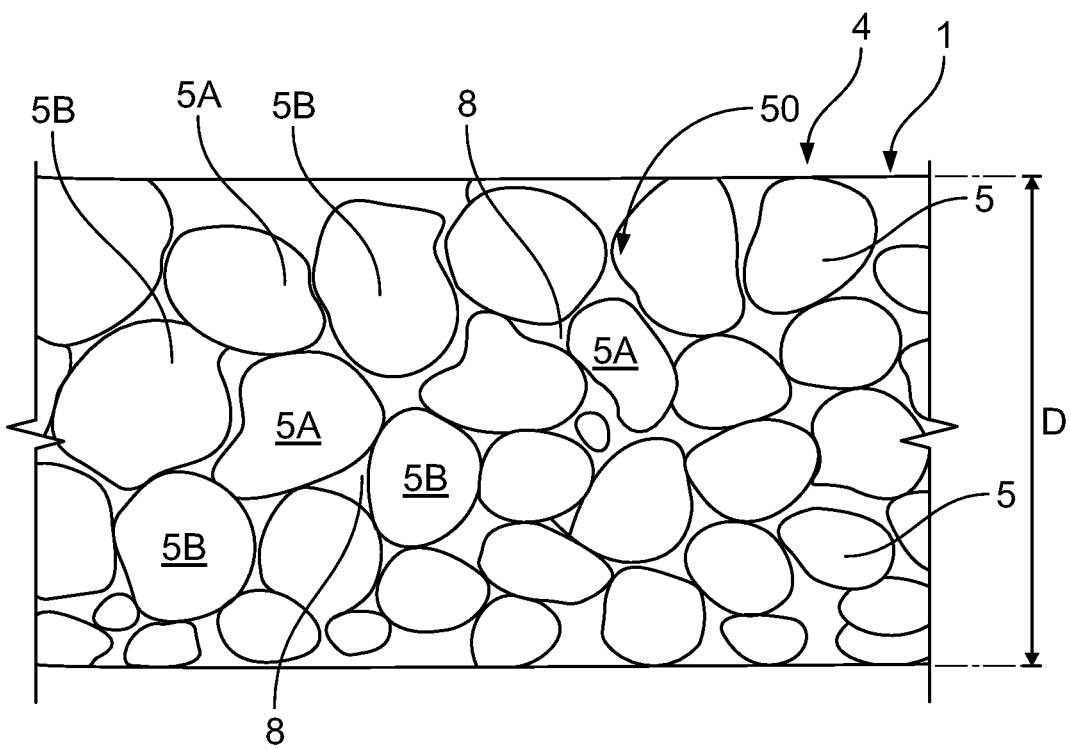
FIG. 2 is a sectional view of a layer of a substrate of the sensor assembly.

The substrate 1, in the embodiment shown in FIG. 2, has a grain structure 50 in which a mixture of aluminum oxide grains 5A and zirconium dioxide grains 5B are present. The substrate 1 comprises only a single layer 4 here. Gaps 8 are present between the grains 5, 5A, 5B. The substrate 1 is produced by mixing aluminum oxide grains 5A and zirconium dioxide grains 5B in powder form. A solvent, which is evaporated by heating in a subsequent step, for example, may have been used to mix the powder aluminum oxide grains 5A and the zirconium dioxide grains 5B prior to evaporation. In an embodiment, the proportion of aluminum oxide to zirconium dioxide is between 50 and 80%, and may be 67%. If the substrate 1 consists only of these two components, there is therefore around 40% aluminum oxide and 60% zirconium dioxide.

Figure 3:
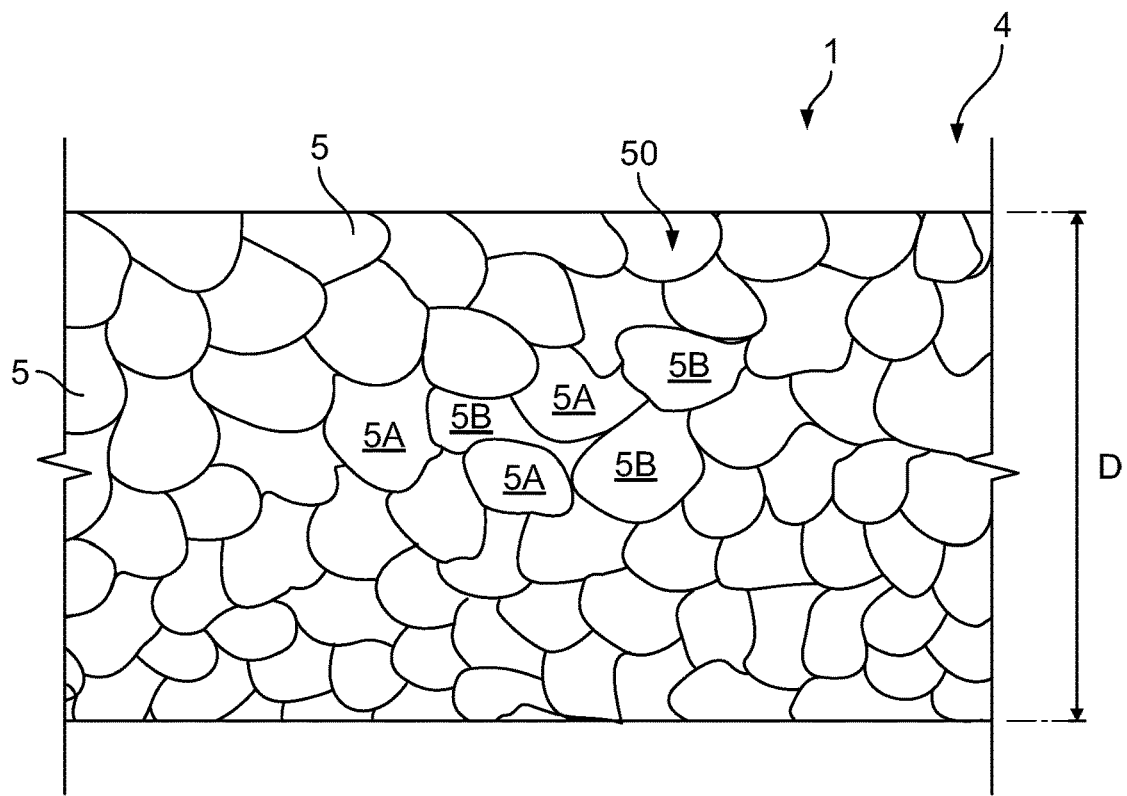
FIG. 3 is a sectional view of another layer of the substrate.

A substrate 1 according to another embodiment is shown in FIG. 3. In the substrate 1 of FIG. 3, no gaps are present. The grains 5, 5A, 5B are situated close to one another and the substrate 1 is particularly compact as a result. Such a configuration can be achieved by compacting the mixture of grains 5, 5A, 5B or partially fusing the grains 5, 5A, 5B.

In order to keep the surface of the substrate 1 sufficiently smooth, the grains 5 should not be too large. On the other hand the production of fine powders is complex. Consequently, in an embodiment, grains 5 between 1 μm and 50 μm are used. In other embodiments, grains 5 up to 0.1 μm or up to 100 μm may also be used.

Figure 4:
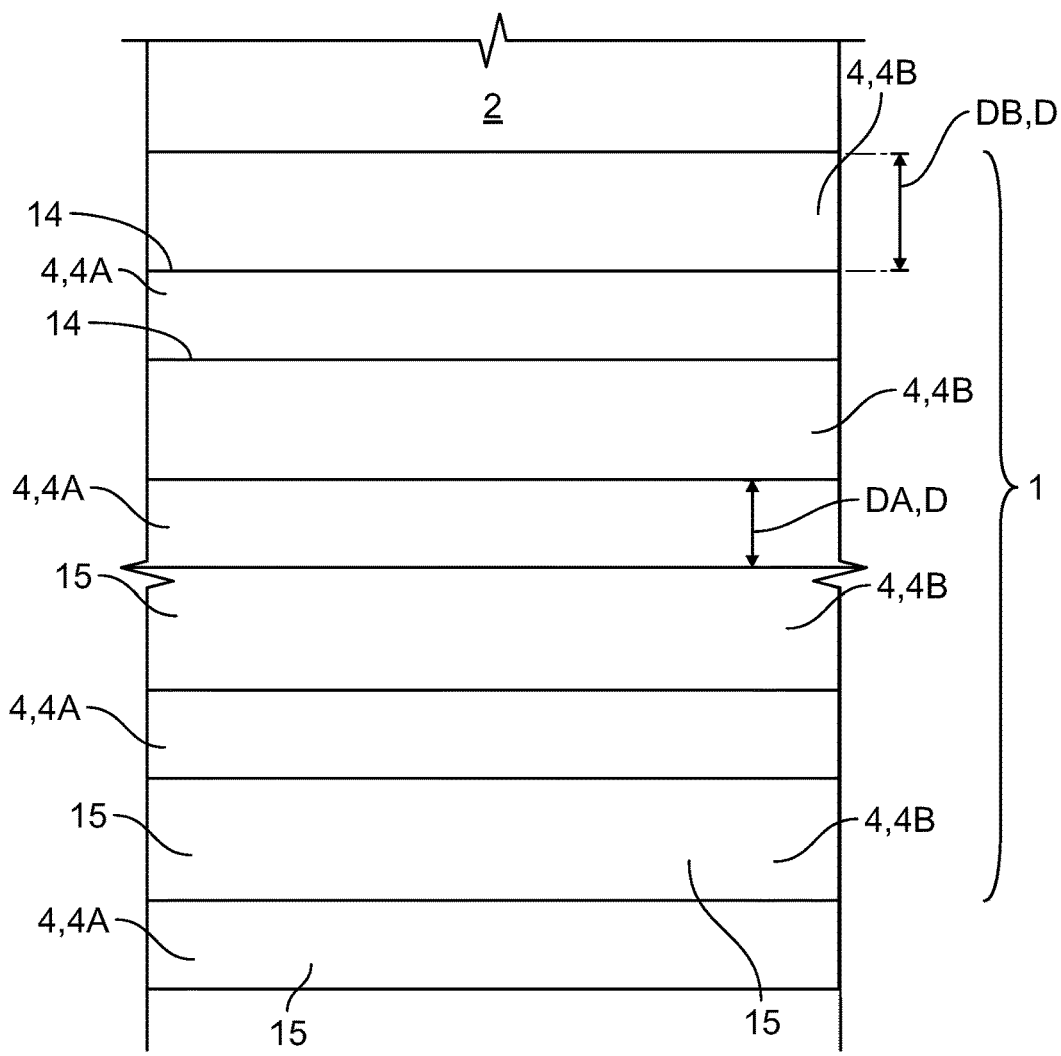
FIG. 4 is a sectional view of another substrate.

Another embodiment of a substrate 1 is shown in FIG. 4. As shown in FIG. 4, the substrate 1 has several layers 4 including first and second layers 4A, 4B arranged over one another. The first and second layers 4A, 4B may be made of different materials. The individual layers 4, 4A, 4B are, in the embodiment of FIG. 4, each pure layers made of only one single material with a grain structure 50. In the shown embodiment, the material of the first layer 4A is aluminum oxide and the material of the second layer 4B is zirconium dioxide. The boundary region 14 is small compared to the core region 15, so that overall the behavior of the core regions 15 determines the behavior of the substrate 1.

The zirconium dioxide layers 4B and the aluminum oxide layers 4A, as shown in FIG. 4, are disposed in an alternating manner to keep strains between the individual layers low. Alternatively, it is also possible for two or more first layers 4A or second layers 4B to be arranged adjacent one another, onto which follow one or more second layers 4B or first layers 4A. This can be required, for example, if only layers of a particular thickness can be produced.

The ratio of a thickness DA of the aluminum oxide layers 4A to a thickness DB of the zirconium dioxide layers 4B is approximately 2:3. The sum of the thicknesses DB of the zirconium dioxide layers 4B is approximately 150% of the sum of the thicknesses DA of the aluminum oxide layers 4A. In an embodiment, the sum of the thicknesses DB of all zirconium dioxide layers 4B can also be between 100% and 200% of the sum of the thicknesses DA of all aluminum oxide layers 4A. As a result, the substrate 1 has a thermal coefficient of expansion which is adapted to correspond to the thermal coefficient of expansion of the measuring structure 2.

In an embodiment, the thickness DA, DB of the individual layers 4A, 4B is between 30 μm and 80 μm. As a result, no excessively large warping forces can build up between the layers 4A, 4B. At the same time, the boundary region 14 between the layers 4A, 4B is small compared to the thicknesses DA, DB of the layers 4A, 4B, which means that the core regions 15 of the layers 4A, 4B determine the behavior of the substrate 1.

In the embodiment shown in FIG. 4, the substrate 1 has eight layers 4. However, there can also be more or fewer layers 4 in the substrate 1. In order to be able to produce the substrate 1 efficiently and at the same time to obtain good functionality, a total of between 5 and 25 layers can be present. In another embodiment, approximately 9 to 15 layers are present.

Figure 2A:
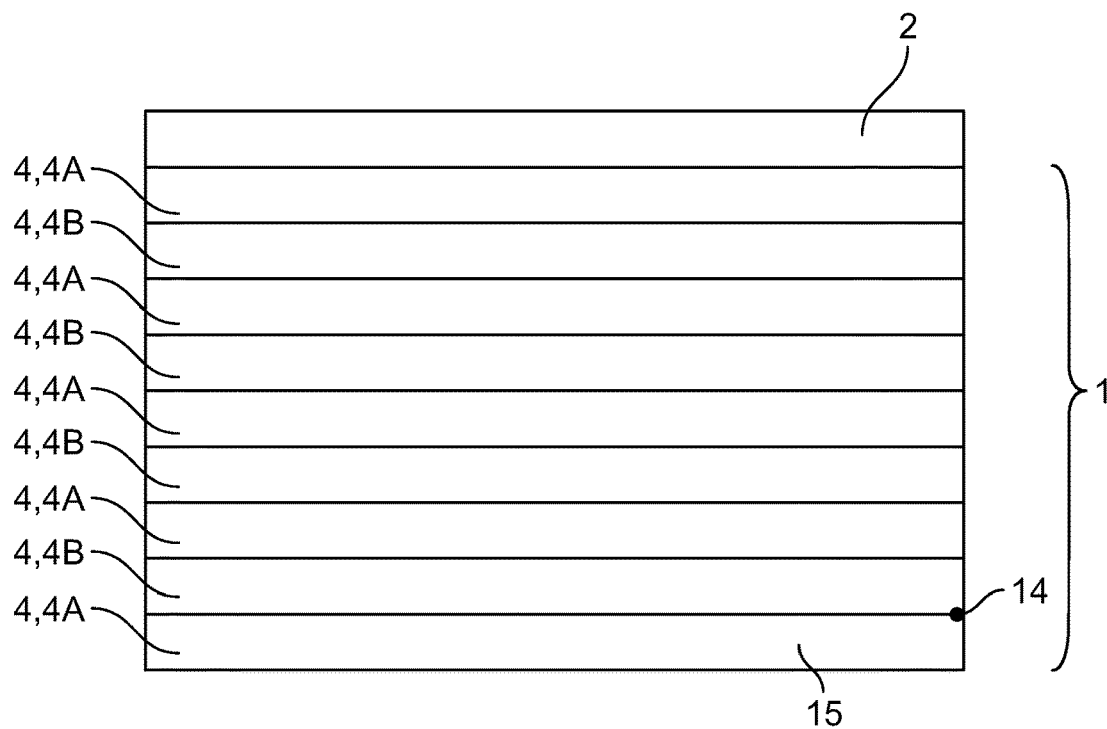
FIG. 2A is a sectional view of the substrate.

In another embodiment of the substrate 1, as shown in FIG. 2A, the substrate 1 has an uppermost layer 4 and a lowest layer 4 consist of the same material 4A, aluminum oxide. In such a configuration, the substrate 1 remains free of warping due to the odd number of layers 4, and the substrate 1 can be used on both sides if necessary.

Figure 5:
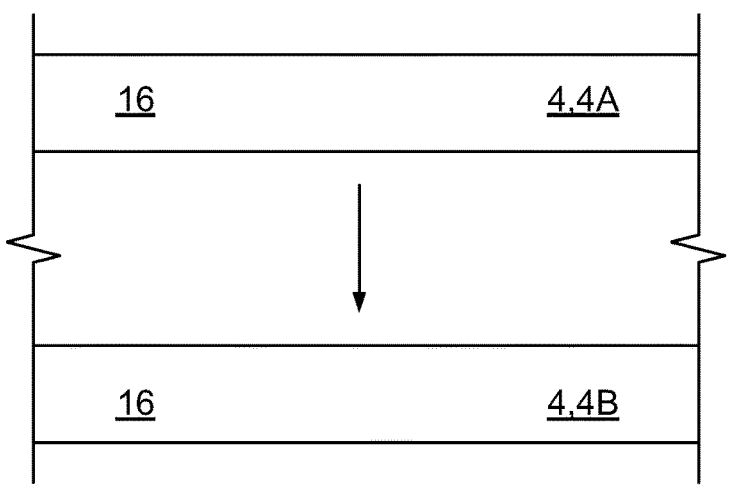
FIG. 5 is a schematic of a method of producing the substrate.

A method of producing a substrate 1 is shown in FIG. 5. The layers 4 present as foil material 16 are mechanically deposited on one another. The upper layer 4, an aluminum oxide layer 4A here, is laid onto the lower layer 4, here a zirconium dioxide layer 4B. The two layers 4 have been produced individually in advance. For example, a paste can be applied thinly. After a stabilization step, in which stabilization has taken place through heating, for example, one layer 4 may be deposited onto the other layer 4 for example by laying it on. If several of these layers 4 are deposited on one another, the formed substrate 1 may be heated after a possible mechanical compression step for a better connection. This subsequent heating can take place at a higher temperature.

Figure 6:
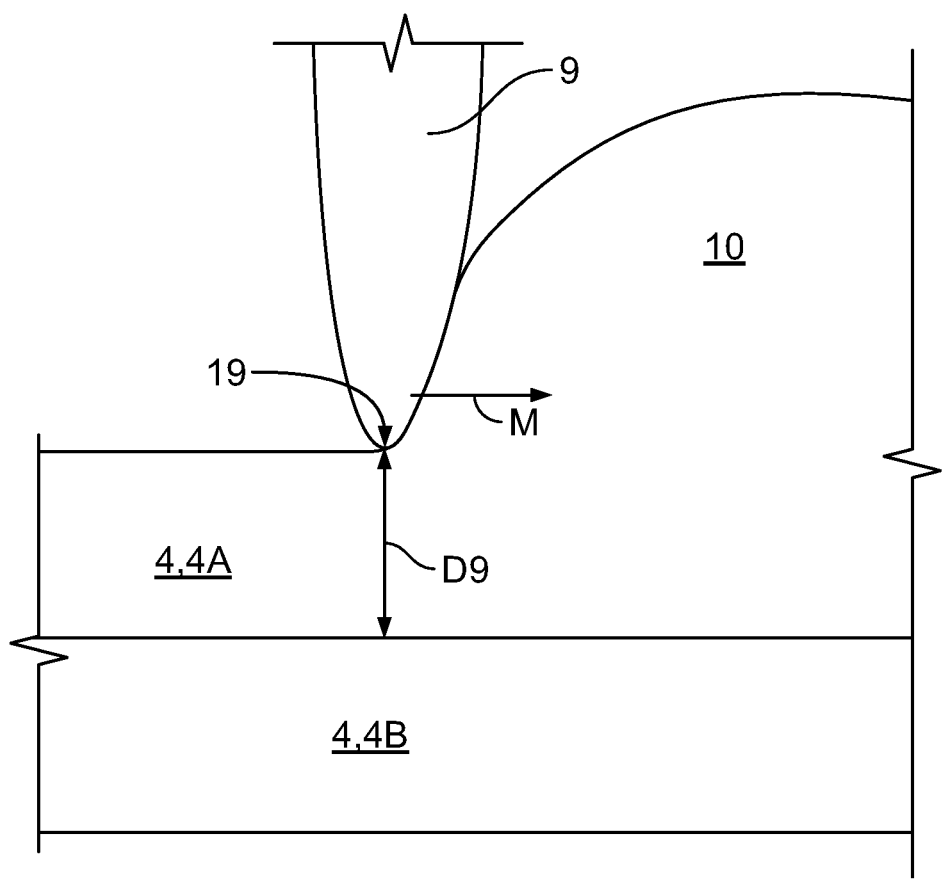
FIG. 6 is a schematic of another method of producing the substrate.

A method of producing a substrate 1 according to another embodiment is shown in FIG. 6. In the method of FIG. 6, an upper layer 4A, such as an aluminum oxide layer 4A, is deposited onto an already present lower layer 4B, such as a zirconium dioxide layer 4B. The upper layer 4A is produced by applying a paste 10 with a tool 9. The tool 9 moves along a direction of movement M with a tip 19 of the tool 9 at a suitable spacing D9 over the lower layer 4B. The upper layer 4A created as a result can be stabilized easily, for example, by heating. Additional layers 4 may then be deposited.

Figure 6A:
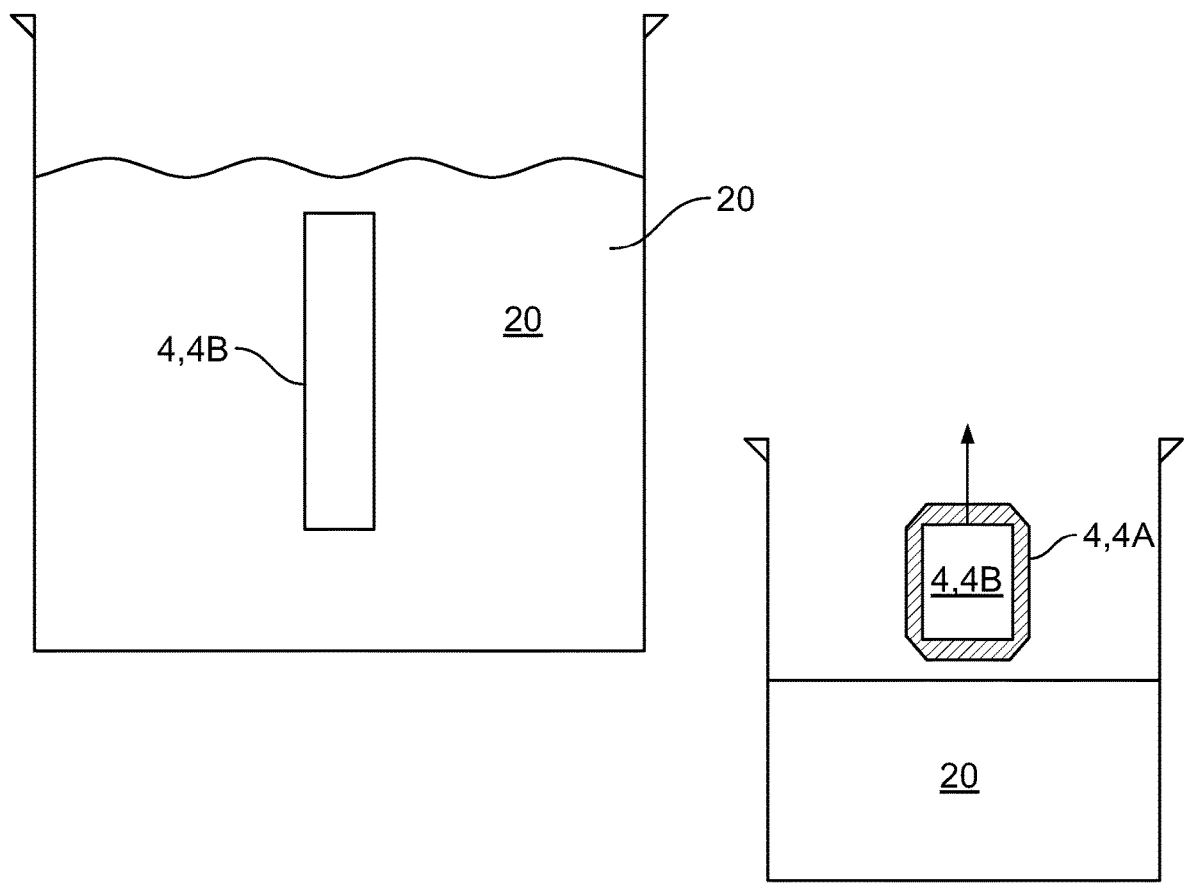
FIG. 6A is a schematic of another method of producing the substrate.

A method of producing a substrate 1 according to another embodiment is shown in FIG. 6A. In this case, upper layers 4A, such as aluminum oxide layers 4A, are deposited on an already present lower layer 4B, such as a zirconium dioxide layer 4B, through a dipping process in a suspension 20 or in a molecular solution. The substrate 1 is moved out of the solution at a uniform speed. The upper layers 4A created as a result can be stabilized easily by heating. Additional layers 4 may then be deposited, or these layers 4 may already form the substrate 1 required for the measuring structure 2.

In other embodiments of the substrate 1, the cover layer 3 can be completely or partially disposed over the sensor assembly 7. The cover layer 3 too can have the inventive construction in layers. The cover layer 3 may comprise aluminum oxide, a combination of aluminum oxide and magnesium oxide and/or magnesium titanate and may be deposited by sputter deposition.

Figure 7:
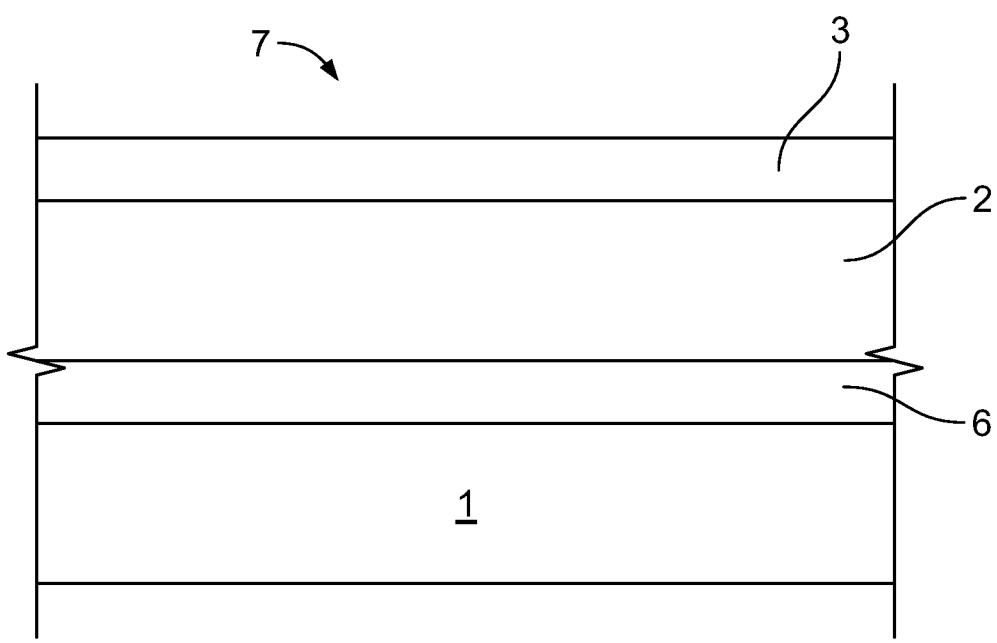
FIG. 7 is a sectional view of another sensor assembly according to the invention.

A sensor assembly 7 according to another embodiment of the invention is shown in FIG. 7. In the sensor assembly 7 of FIG. 7, an electrical insulation layer 6 is disposed between the substrate 1 and the measuring structure 2. The electrical insulation layer 6 may be generated by sputter deposition on the substrate 1, for example. The electrical insulation layer 6 may comprise aluminum oxide, a combination of magnesium oxide and aluminum oxide and/or magnesium titanate. In an embodiment, the electrical insulation layer 6 has a thickness of approximately 2-5 μm.

Advantageously, in the substrate 1 of the sensor assembly 7 for a resistance thermometer according to the invention, the substrate 1 has a thermal coefficient of expansion which is adapted to correspond to the thermal coefficient of expansion of the platinum measuring structure 2, avoiding damage or tears due to different thermal coefficients of expansion. If an attempt were made to adapt the substrate 1, with regard to its thermal coefficient of expansion, to the platinum by mixing magnesium oxide powder and aluminum oxide powder, for example, in a ratio which mathematically leads to a coefficient of expansion which corresponds to that of the platinum, then this would not be successful because the magnesium oxide and the aluminum oxide react with one another at the boundary layers of the powder grains and the coefficient of expansion of this mixture deviates from the coefficients of expansion to be expected. In order to reach a desired thermal coefficient of expansion, complex series of experiments consequently have to be carried out in order to find a suitable mixture. In the substrate 1 of the present invention combining aluminum oxide and zirconium dioxide, no reactions which alter the properties, in particular the thermal coefficients of expansion, occur. The substrate 1 can thus be produced in which the thermal coefficient of expansion is adapted to that of the platinum without carrying out a complex series of experiments.

What is claimed is:
1. A substrate for a sensor assembly of a resistance thermometer, comprising:
a plurality of layers on which a measuring structure is disposed, the plurality of layers consist of aluminum oxide and zirconium dioxide and have a thermal coefficient of expansion approximately equal to a thermal coefficient of expansion of the measuring structure, the plurality of layers include a plurality of first layers of aluminum oxide and a plurality of second layers of zirconium dioxide disposed over one another.

2. The substrate of claim 1, wherein the first and second layers are disposed in an alternating manner.

3. The substrate of claim 1, wherein a total number of the first and second layers is between 5 and 25 layers.

4. The substrate of claim 1, wherein a sum of thicknesses of the second layers is approximately 150% of a sum of thicknesses of the first layers.

5. The substrate of claim 1, wherein a thickness of each of the first layers and each of the second layers is between 30 µm and 80 µm.

6. A sensor assembly of a resistance thermometer, comprising:
   a substrate having a plurality of layers, the plurality of layers consist of aluminum oxide and zirconium dioxide and include a plurality of first layers of aluminum oxide and a plurality of second layers of zirconium dioxide disposed over one another; and
   a measuring structure disposed on the substrate, a thermal coefficient of expansion of the substrate is approximately equal to a thermal coefficient of expansion of the measuring structure.

7. The sensor assembly of claim 6, wherein the measuring structure is formed of platinum.

8. The sensor assembly of claim 6, further comprising an insulation layer disposed between the substrate and the measuring structure.

9. A resistance thermometer, comprising:
   a sensor assembly having a substrate formed of a plurality of layers consisting of aluminum oxide and zirconium dioxide, the plurality of layers include a plurality of first layers of aluminum oxide and a plurality of second layers of zirconium dioxide disposed over one another, and a measuring structure disposed on the substrate, a thermal coefficient of expansion of the substrate approximately equal to a thermal coefficient of expansion of the measuring structure.

10. The resistance thermometer of claim 9, wherein the measuring structure is formed of platinum.

\* \* \* \* \*